US012677346B2

(12) United States Patent
Shrestha et al.

(10) Patent No.: US 12,677,346 B2
(45) Date of Patent: Jul. 7, 2026

(54) METHODS AND SYSTEMS FOR UPDATE OF CELL-SPECIFIC KOFFSET IN NTN

(71) Applicant: QUALCOMM Incorporated, San Diego, CA (US)

(72) Inventors: Bharat Shrestha, San Diego, CA (US); Ayan Sengupta, San Diego, CA (US); Xiao Feng Wang, San Diego, CA (US); Alberto Rico Alvarino, San Diego, CA (US); Umesh Phuyal, San Diego, CA (US); Liangping Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 680 days.

(21) Appl. No.: 18/066,702

(22) Filed: Dec. 15, 2022

(65) Prior Publication Data

US 2024/0049336 A1     Feb. 8, 2024

Related U.S. Application Data

(60) Provisional application No. 63/395,633, filed on Aug. 5, 2022.

(51) Int. Cl.
*H04W 76/27* (2018.01)
*H04W 48/16* (2009.01)
*H04W 76/11* (2018.01)

(52) U.S. Cl.
CPC ........... *H04W 76/27* (2018.02); *H04W 48/16* (2013.01); *H04W 76/11* (2018.02)

(58) Field of Classification Search
CPC ..... H04W 76/27; H04W 48/16; H04W 76/11; H04W 48/12
See application file for complete search history.

(56) References Cited

U.S. PATENT DOCUMENTS

| | | | | |
|---|---|---|---|---|
| 2018/0234917 A1* | 8/2018 | Kim | ...................... | H04W 72/23 |
| 2019/0289661 A1* | 9/2019 | Chen | ................ | H04W 74/0866 |
| 2020/0015292 A1* | 1/2020 | Tavildar | ................ | H04W 52/02 |
| 2020/0137666 A1* | 4/2020 | Agiwal | .............. | H04W 68/005 |
| 2021/0175964 A1* | 6/2021 | Kusashima | ....... | H04W 56/0005 |
| 2021/0281520 A1* | 9/2021 | Shrestha | ........... | H04W 56/0045 |
| 2021/0360493 A1 | 11/2021 | Shrestha et al. | | |

(Continued)

OTHER PUBLICATIONS

International Search Report and Written Opinion—PCT/US2023/067602—ISA/EPO—Sep. 19, 2023.

(Continued)

*Primary Examiner* — Kevin T Bates
(74) *Attorney, Agent, or Firm* — ArentFox Schiff LLP

(57) ABSTRACT

A user equipment may be configured to implement a procedure for implementing a procedure for updating cell-specific parameters used by a UE in non-terrestrial networks (NTN). In some aspects, the UE may receive, from a network entity, during a modification period of system information, system information including one or more cell-specific parameters. Further, the UE may enter a radio resource configuration (RRC) connected mode based upon receipt of the system information, and transmit an acquisition indication of receipt of the system information, the acquisition indication identifying an instance within the modification period of receipt of the system information.

18 Claims, 14 Drawing Sheets

1200

(56) References Cited

U.S. PATENT DOCUMENTS

| | | | | |
|---|---|---|---|---|
| 2022/0124795 A1* | 4/2022 | Wu | .................... | H04W 56/0045 |
| 2023/0038675 A1* | 2/2023 | Wang | ................. | H04B 7/18513 |
| 2023/0155669 A1* | 5/2023 | Liberg | .............. | H04W 56/0035 |
| | | | | 370/316 |
| 2023/0327753 A1* | 10/2023 | Lin | .................... | H04B 7/18545 |
| | | | | 370/316 |
| 2023/0344508 A1* | 10/2023 | Tseng | ................. | H04W 56/005 |
| 2024/0364416 A1* | 10/2024 | Medeiros De Amorim | ................ | |
| | | | | H04B 7/18563 |
| 2025/0093522 A1* | 3/2025 | Hu | ........................ | H04W 24/08 |
| 2025/0150945 A1* | 5/2025 | Cui | ........................ | H04W 48/12 |
| 2025/0159632 A1* | 5/2025 | Zhu | ................... | H04W 56/0045 |
| 2025/0193820 A1* | 6/2025 | Zhu | ........................ | H04L 5/0053 |

OTHER PUBLICATIONS

Huawei., et al., "Adressing RRC Editor's notes", 3GPP TSG-RAN2 Meeting #118-e, R2-2205329, 3rd Generation Partnership Project (3GPP), Mobile Competence Centre, 650, Route Des Lucioles, F-06921 Sophia-Antipolis Cedex, France vol. RAN WG2, No. Online, May 9, 2022-May 20, 2022, Apr. 25, 2022, 4 Pages, XP052138875, paragraph [02.1]-paragraph [02.2] paragraph [02.5].

Partial International Search Report—PCT/US2023/067602—ISA/EPO—Jul. 24, 2023.

ZTE Corporation., et al., "FFS and RILO301 etc for SIB31", 3GPP TSG-RAN WG2 Meeting #118 E-meeting, R2-2205140, 3rd Generation Partnership Project, Mobile Competence Centre, 650, Route Des Lucioles, F-06921 Sophia-Antipolis Cedex, France, vol. RAN WG2, No. E-meeting, May 9, 2022-May 20, 2022, Apr. 25, 2022, 3 Pages, XP052138735, paragraph [0001]-paragraph [0002].

ZTE (Email Discussion Rapporteur): "Report of [AT118-e][050][IoTNTN] RRC Miscellaneous (Zte)", 3GPP TSG-RAN WG2 Meeting #118 electronic, R2-2206529, 3rd Generation Partnership Project, Mobile Competence Centre, 650, Route Des Lucioles, F-06921 Sophia-antipolis Cedex, France, vol. RAN WG2, No. electronic, May 9, 2022-May 20, 2022, May 27, 2022, 24 Pages, XP052156560, paragraph [03.1]-paragraph [3.1.2], paragraph [0004].

* cited by examiner

1200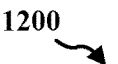

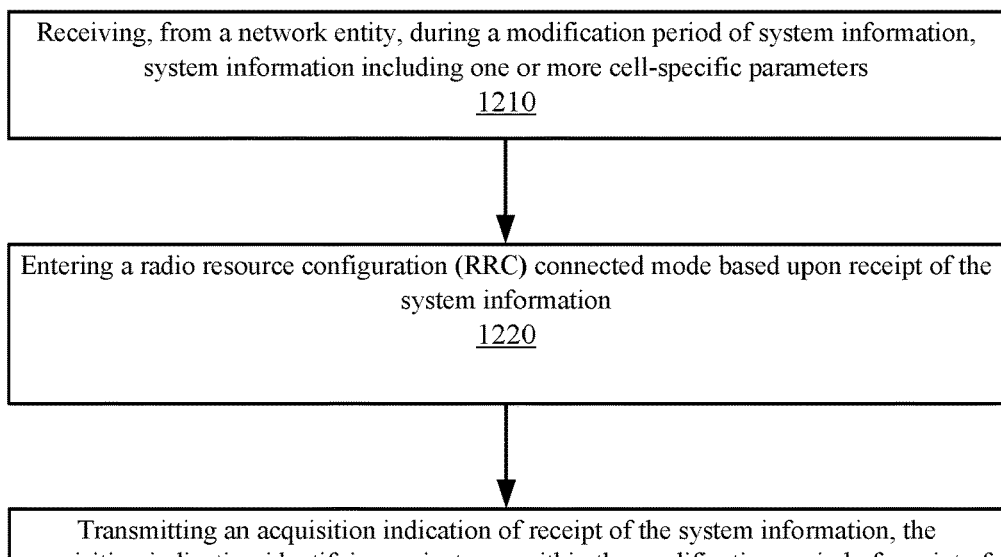

Receiving, from a network entity, during a modification period of system information, system information including one or more cell-specific parameters
1210

Entering a radio resource configuration (RRC) connected mode based upon receipt of the system information
1220

Transmitting an acquisition indication of receipt of the system information, the acquisition indication identifying an instance within the modification period of receipt of the system information
1230

FIG. 12

1300

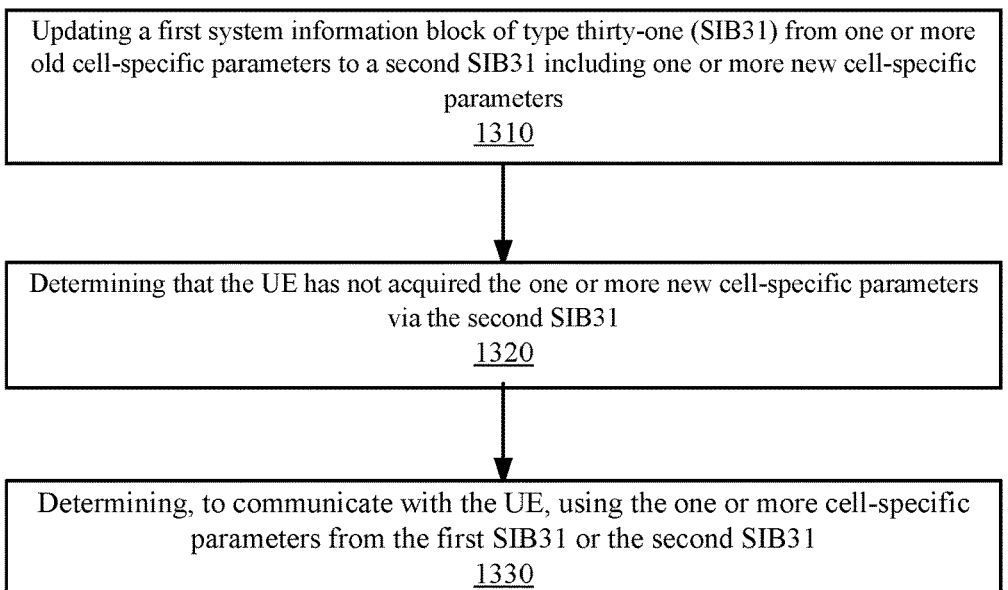

Updating a first system information block of type thirty-one (SIB31) from one or more old cell-specific parameters to a second SIB31 including one or more new cell-specific parameters
1310

Determining that the UE has not acquired the one or more new cell-specific parameters via the second SIB31
1320

Determining, to communicate with the UE, using the one or more cell-specific parameters from the first SIB31 or the second SIB31
1330

FIG. 13

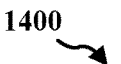

1400

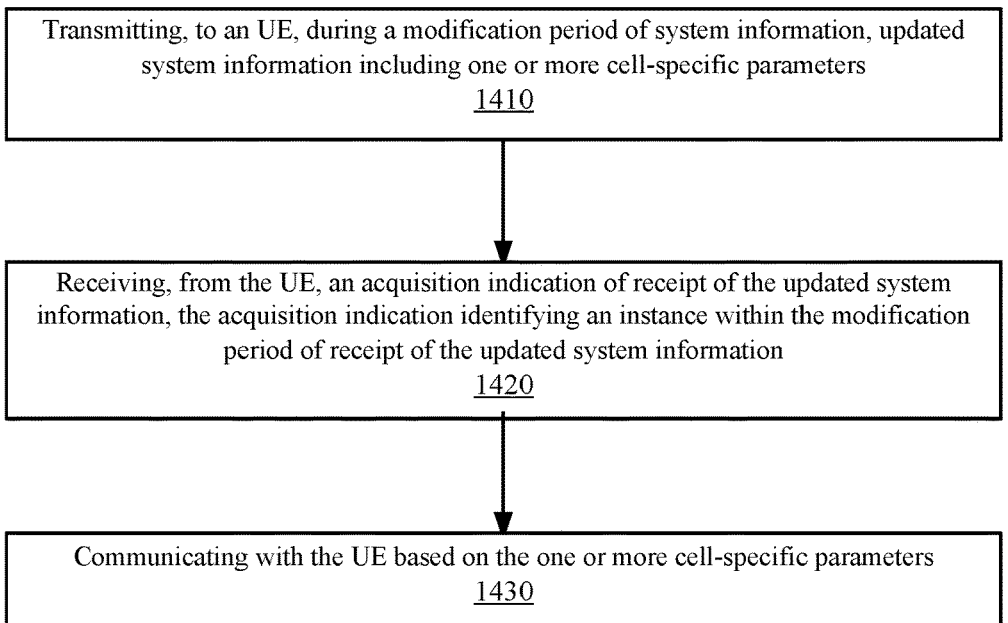

Transmitting, to an UE, during a modification period of system information, updated system information including one or more cell-specific parameters
1410

Receiving, from the UE, an acquisition indication of receipt of the updated system information, the acquisition indication identifying an instance within the modification period of receipt of the updated system information
1420

Communicating with the UE based on the one or more cell-specific parameters
1430

FIG. 14

METHODS AND SYSTEMS FOR UPDATE OF CELL-SPECIFIC KOFFSET IN NTN

CROSS-REFERENCE TO RELATED APPLICATION

This application claims priority to U.S. Patent Application No. 63/395,633, entitled "METHODS AND SYSTEMS FOR UPDATE OF CELL-SPECIFIC KOFFSET IN NTN," filed on Aug. 5, 2022, the disclosure of which is incorporated by reference herein in its entirety.

BACKGROUND

Technical Field

The present disclosure relates generally to wireless communication, and more particularly, implementing a procedure for updating cell-specific parameters used by devices in non-terrestrial networks (NTN).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a method of non-terrestrial network (NTN) wireless communication at a user equipment (UE), including: receiving, from a network entity, during a modification period of system information, system information including one or more cell-specific parameters; entering a radio resource configuration (RRC) connected mode based upon receipt of the system information; and transmitting an acquisition indication of receipt of the system information, the acquisition indication identifying an instance within the modification period of receipt of the system information. In addition, the disclosure also provides an apparatus including means for performing the above method, and a non-transitory computer-readable medium storing computer-executable instructions for performing the above method.

In some aspects, the techniques described herein relate to a user equipment (UE) for non-terrestrial network (NTN) wireless communication, including: a memory storing computer-executable instructions; and at least one processor coupled with the memory and configured to execute the computer-executable instructions to: receive, from a network entity, during a modification period of system information, system information including one or more cell-specific parameters; enter a radio resource configuration (RRC) connected mode based upon receipt of the system information; and transmit an acquisition indication of receipt of the system information, the acquisition indication identifying an instance within the modification period of receipt of the system information.

In some aspects, the techniques described herein relate to a method of non-terrestrial network (NTN) wireless communication by a network entity with a user equipment (UE), including: transmitting, to the UE, during a modification period of system information, system information including one or more cell-specific parameters; receiving, from the UE, an acquisition indication of receipt of the system information, the acquisition indication identifying an instance within the modification period of receipt of the system information; and communicating with the UE based on the one or more cell-specific parameters. In addition, the disclosure also provides an apparatus including means for performing the above method, and a non-transitory computer-readable medium storing computer-executable instructions for performing the above method.

In some aspects, the techniques described herein relate to a network entity for non-terrestrial network (NTN) wireless communication with a user equipment (UE), including: a memory storing computer-executable instructions; and at least one processor coupled with the memory and configured to execute the computer-executable instructions to: update a first SystemInformationBlockType31 (SIB31) from one or more old cell-specific parameters to a second SIB31 including one or more new cell-specific parameters; determine that the UE has not acquired the one or more new cell-specific parameters via the second SIB31; and transmit, via a dedicated message, the second SIB31 to the UE based on the UE not acquiring the one or more new cell-specific parameters via the second SIB31.

To the accomplishment of the foregoing and related ends, the one or more aspects include the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 12 is a flowchart of an example method of reporting acquired cell-specific parameters by a UE in an NTN system, in accordance with some aspects of the present disclosure.

FIG. 13 is a flowchart of an example method of receiving reporting of cell-specific parameters acquired by a UE in an NTN system, in accordance with some aspects of the present disclosure.

FIG. 14 is a flowchart of an example method of transmitting fresh system information to a UE in an NTN system, in accordance with some aspects of the present disclosure.

DETAILED DESCRIPTION

Figure 1:
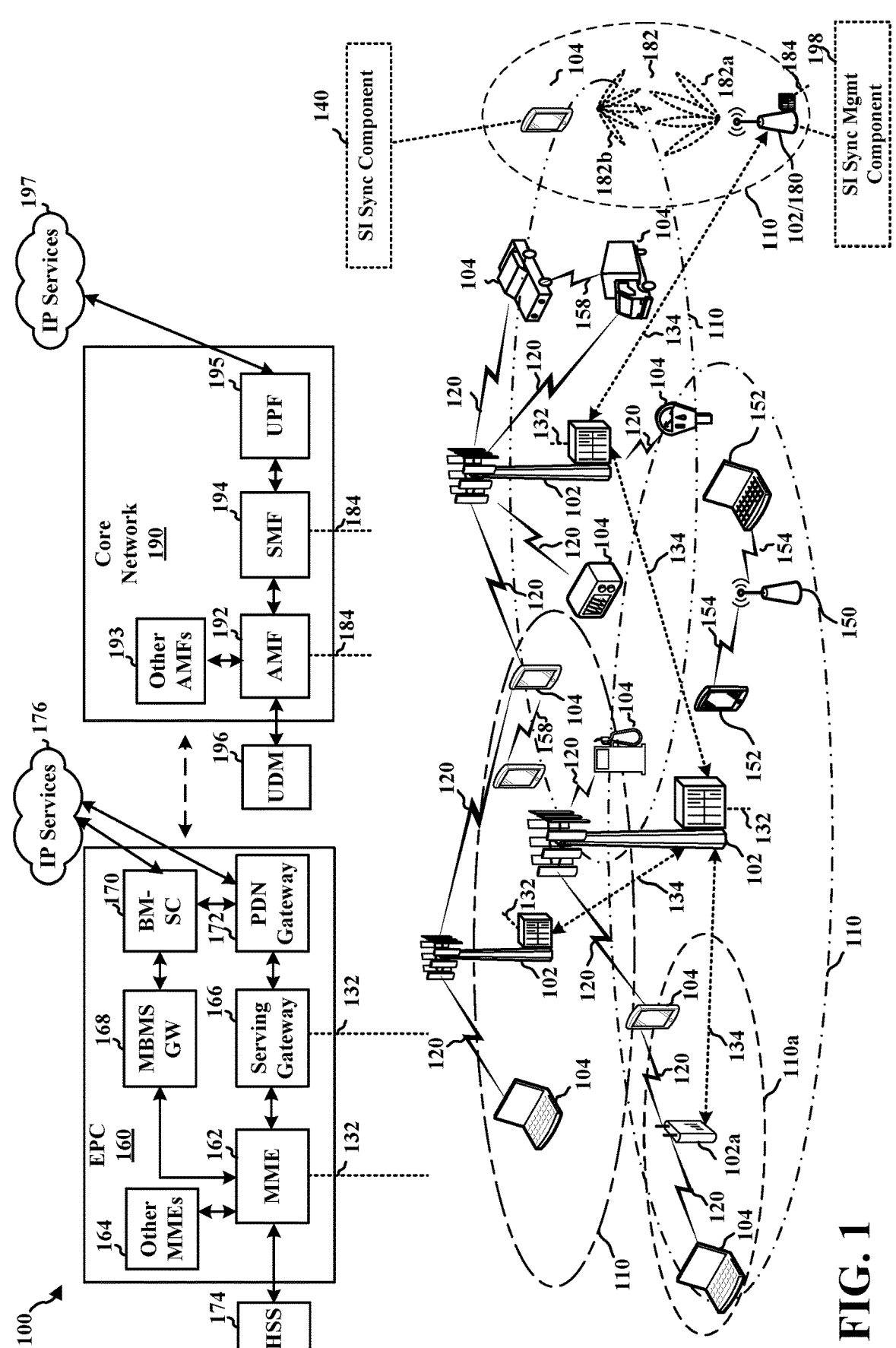
FIG. 1 is a diagram illustrating an example of a wireless communications system and an access network, in accordance with some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to a person having ordinary skill in the art that these concepts may be practiced without these specific details. In some instances, structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various implementations relate generally to a procedure for updating cell-specific parameters used by devices in non-terrestrial networks (NTNs). NTN, in some aspects, may refer to a network that involves non-terrestrial flying objects (e.g., satellite communication networks, high altitude platform systems (HAPS), and air-to-ground networks). In some aspects, e.g., an RRC_CONNECTED mode, UEs (e.g., enhanced machine-type communication (eMTC) IoT devices and narrowband Internet of Things (NB-IoT) devices) are not required to acquire system information or monitor paging for any state formation notification. Consequently, a network may change a cell-specific K_mac and K_offset in SystemInformationBlockType31 (SIB31) without notifying an UE, which may result in the UE and network being out of sync in response to the cell-specific K_offset or K_mac employed by the UE (e.g., in RRC-CONNECTED mode) being different from the current cell-specific K_offset or K_mac in SIB31s broadcast by the network as a result of the change to the cell-specific K_mac and K_offset. Further, the probability of the UE and the network being out of sync may increase when the UE begins RACH close to a state information modification boundary. In some other aspects, a network may limit when the cell-specific parameters are updated using a validity duration. However, this approach may cause inefficient power consumption when system information is acquired close to when the network updates the cell-specific parameters as the UE will have to reacquire the cell-specific parameters immediately. In yet still some other aspects, a UE may be configured to report the beginning or the end of a validity period. However, this approach has suffered from significant overhead costs at the UE.

As such, in some aspects, a UE or network entity may be configured to manage the freshness of cell-specific parameters employed by the UE. As described in detail herein, a UE may report an acquisition indication to a network entity, wherein the acquisition indication indicates when the UE acquired the cell-specific parameters. Further, the network entity may use the acquisition indication to determine whether the UE should be sent updated system information. In some other aspects, a network entity may be configured to determine the freshness of the cell-specific parameters (i.e., whether the cell-specific parameters are the most recent cell-specific parameters) possessed by a UE and transmit updated cell-specific parameters when the cell-specific parameters possessed by the UE are outdated. Accordingly, in some aspects, a UE and network may maintain synchronization, ensure that the network is aware of when a UE's uplink (UL) synchronization timer (T317) expires and the cell-specific parameters that are being employed by the UE, and transmit system information to the UE before expiration of the T317 currently used by the UE.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

In an aspect, a UE 104 may be an internet of things (IoT) device, e.g., an (eMTC) or (NB-IoT). Further, the UE 104 may include a state information (SI) synchronization (sync) component 140 configured to receive and employ non-terrestrial network (NTN) state information (e.g., SIB31 and SystemInformationBlockType19 (SIB19) NTN-Config-r17) received from a base station 102/180. Further, in some aspects, the SI synch component 140 may report acquisition information indicating receipt of the state information from the base station 102/180. Additionally, a base station 102/180 may include a SI sync management component 198 configured to periodically transmit state information to the UEs 104, receive acquisition information from the UEs 104 in response to receipt of the state information, and manage the freshness of the state information provided to the UEs 104.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 100. There may be overlapping geographic coverage areas 100. For example, the small cell 102a may have a coverage area 100a that overlaps the coverage area 100 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.10 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102a may operate in a licensed or an unlicensed frequency spectrum. When operating in an unlicensed frequency spectrum, the small cell 102a may employ NR and use the same 5 GHz unlicensed frequency spectrum as used by the Wi-Fi AP 150. The small cell 102a, employing NR in an unlicensed frequency spectrum, may boost coverage to or increase capacity of the access network.

A base station 102, whether a small cell 102a or a large cell (for example, macro base station), may include or be referred to as an eNB, gNodeB (gNB), or another type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (416 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182a. The UE 104 may receive the beamformed signal from the base station 180 in one or more receive directions 182b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a satellite phone, a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

Figures 2A, 2B, 2C, 2D:
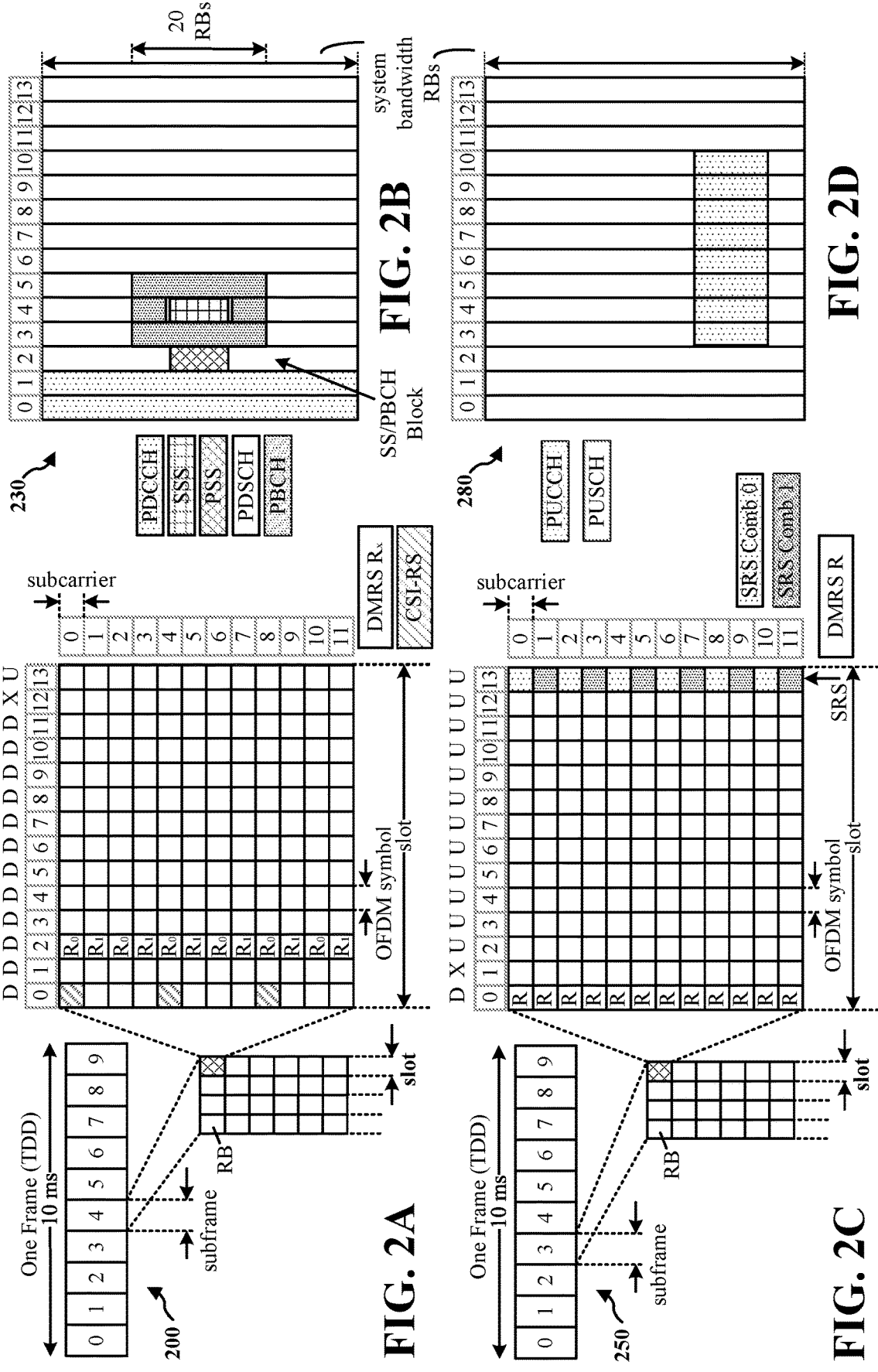
FIG. 2A is a diagram illustrating an example of a first 5G/NR frame, in accordance with some aspects of the present disclosure.
FIG. 2B is a diagram illustrating an example of DL channels within a 5G/NR subframe, in accordance with some aspects of the present disclosure.
FIG. 2C is a diagram illustrating an example of a second 5G/NR frame, in accordance with some aspects of the present disclosure.
FIG. 2D is a diagram illustrating an example of UL channels within a 5G/NR subframe, in accordance with some aspects of the present disclosure.

FIGS. 2A-2D include example diagrams 200, 230, 250, and 280 illustrating examples structures that may be used for wireless communication by the base station 102 and the UE 104, e.g., for 5G NR communication. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. For slot configuration 0 and numerology μ, there are 14 symbols/slot and 2μ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more CCE, each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
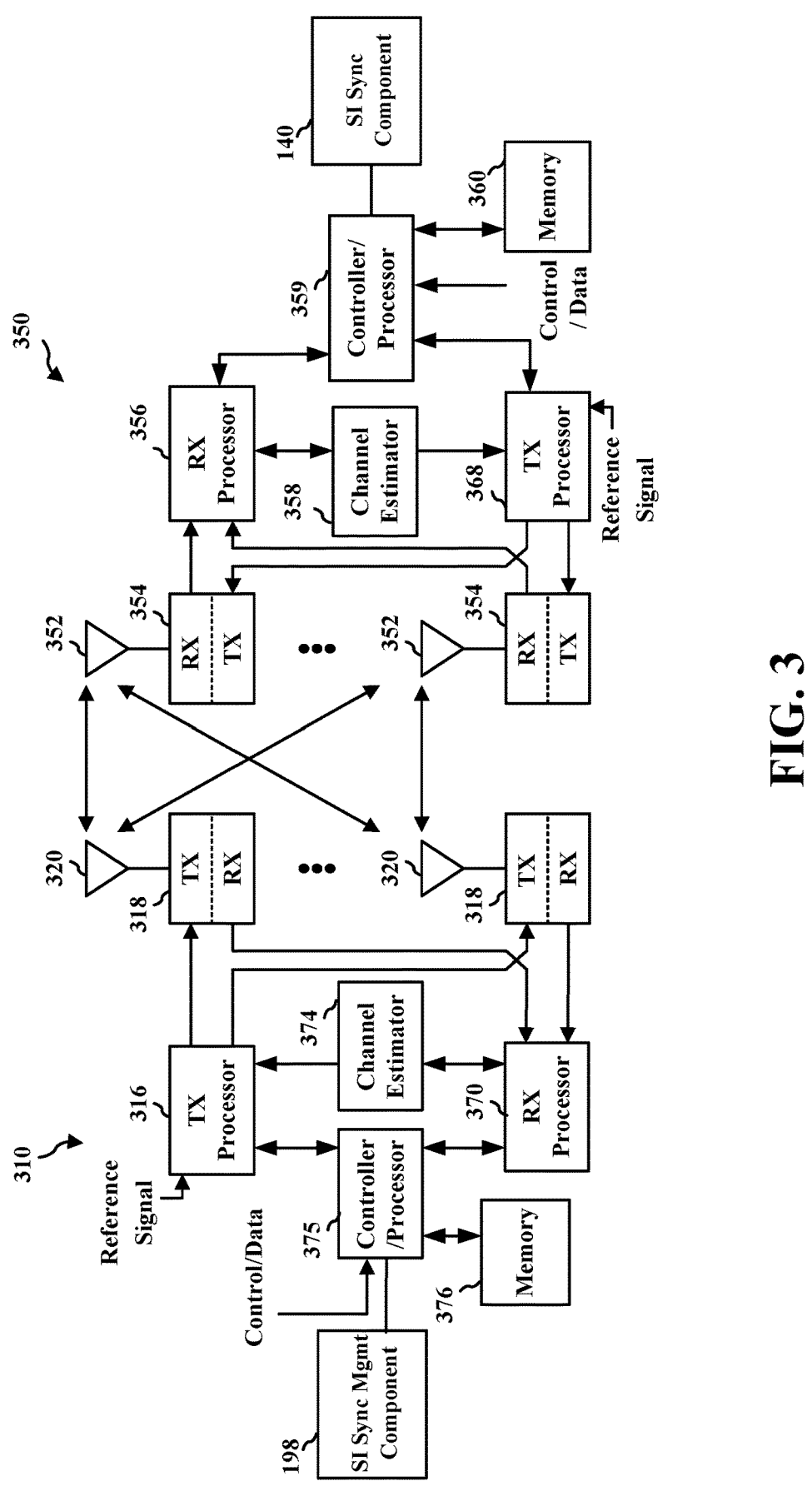
FIG. 3 is a diagram illustrating an example of a base station and a UE in an access network, in accordance with some aspects of the present disclosure.

FIG. 3 is a block diagram of a base station 102/180 in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356.

The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 102/180. These soft decisions may be based on channel estimates computed by the channel estimator 358. The soft decisions are then decoded and deinterleaved to recover the data and control signals that were originally transmitted by the base station 102/180 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 102/180, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102/180 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102/180 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK or NACK protocol to support HARQ operations.

In the UE 104, at least one of the TX processor 368, the RX processor 356, and the controller/processor 359 may be configured to perform aspects in connection with the categorization component 140 of FIG. 1. In the base station 102/180, at least one of the TX processor 316, the RX processor 370, and the controller/processor 375 may be configured to perform aspects in connection with reporting management component 198 of FIG. 1.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 4:
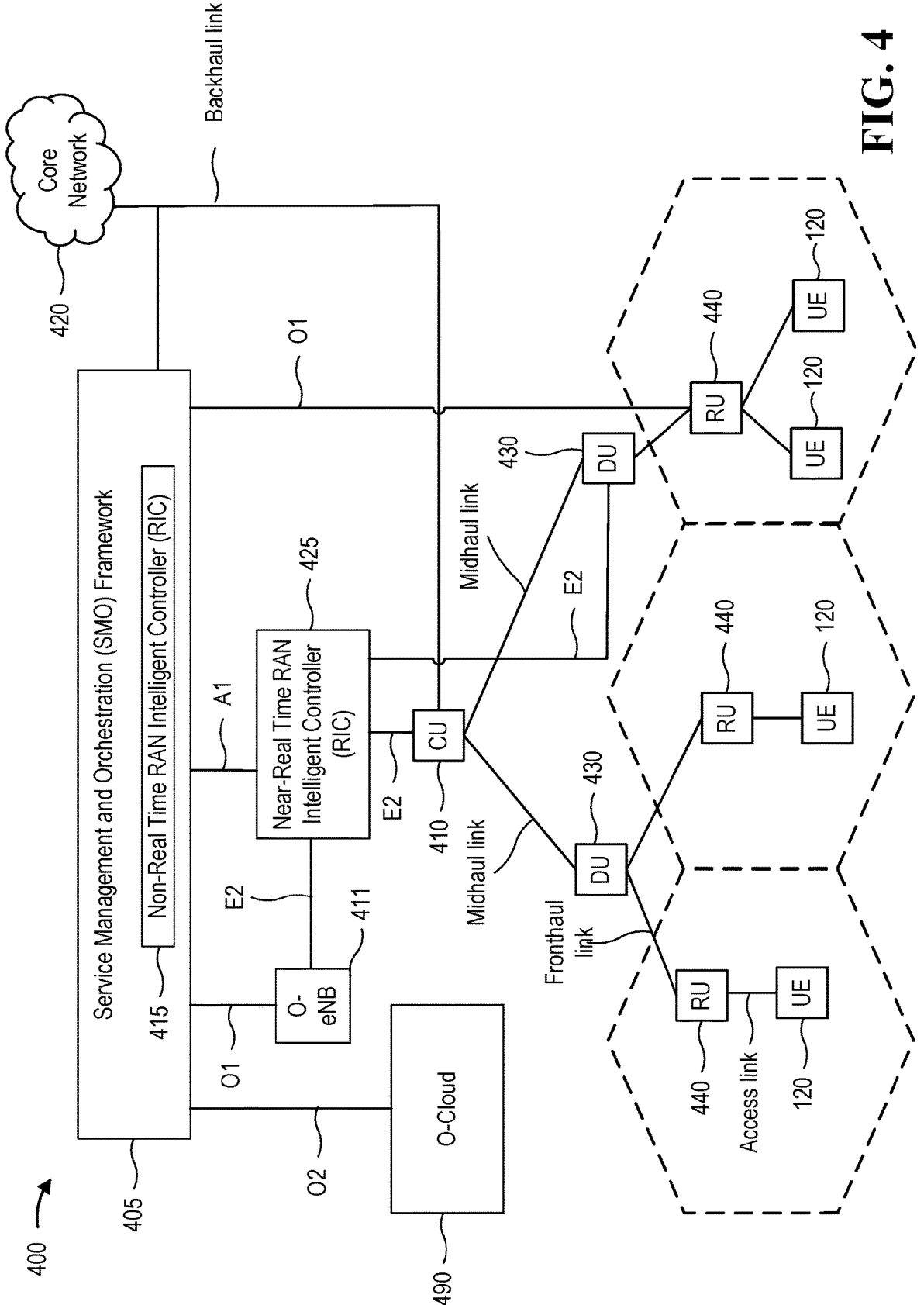
FIG. 4 is a diagram illustrating an example disaggregated base station architecture, in accordance with some aspects of the present disclosure.

FIG. 4 shows a diagram illustrating an example disaggregated base station 400 architecture. The disaggregated base station 400 architecture may include one or more central units (CUs) 410 that can communicate directly with a core network 420 via a backhaul link, or indirectly with the core network 420 through one or more disaggregated base station units (such as a Near-Real Time (Near-RT) RAN Intelligent Controller (RIC) 425 via an E2 link, or a Non-Real Time (Non-RT) RIC 415 associated with a Service Management and Orchestration (SMO) Framework 405, or both). A CU 410 may communicate with one or more distributed units (DUs) 430 via respective midhaul links, such as an F1 interface. The DUs 430 may communicate with one or more radio units (RUs) 440 via respective fronthaul links. The RUs 440 may communicate with respective UEs 104 via one or more radio frequency (RF) access links. In some implementations, the UE 104 may be simultaneously served by multiple RUs 440.

Each of the units, i.e., the CUs 410, the DUs 430, the RUs 440, as well as the Near-RT RICs 425, the Non-RT RICs 415 and the SMO Framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., Central Unit-User Plane (CU-UP)), control plane functionality (i.e., Central Unit-Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random-access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements which may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-RT RICs 425. In some implementations, the SMO Framework 405 can communicate with a hardware aspect of a 4G RAN, such as an open eNB (O-eNB) 410, via an O1 interface. Additionally, in some implementations, the SMO Framework 405 can communicate directly with one or more RUs 440 via an O1 interface. The SMO Framework 405 also may include a non-RT RIC 415 configured to support functionality of the SMO Framework 405.

The Non-RT RIC 415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 425. The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate AI/ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the non-RT RIC 415 or the Near-RT RIC 425 may be configured to tune RAN behavior or performance. For example, the non-RT RIC 415 may monitor long-term trends and patterns for performance and employ AI/ML models to perform corrective actions through the SMO Framework 405 (such as reconfiguration via O1) or via creation of RAN management policies (such as A1 policies).

Referring to FIGS. 5-13, in one non-limiting aspect, a system 500 is configured to implement a procedure for updating cell-specific parameters used by UEs in non-terrestrial networks, in accordance with some aspects of the present disclosure.

Figure 5:
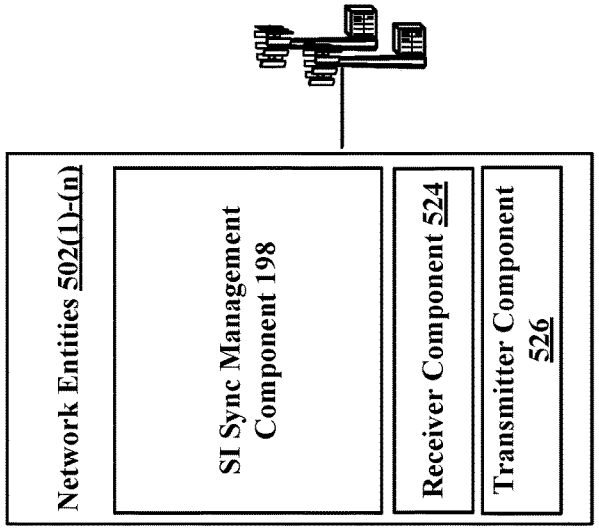
FIG. 5 is a diagram illustrating an example of communications of a network entities and devices, in accordance with some aspects of the present disclosure.
Figure 5:
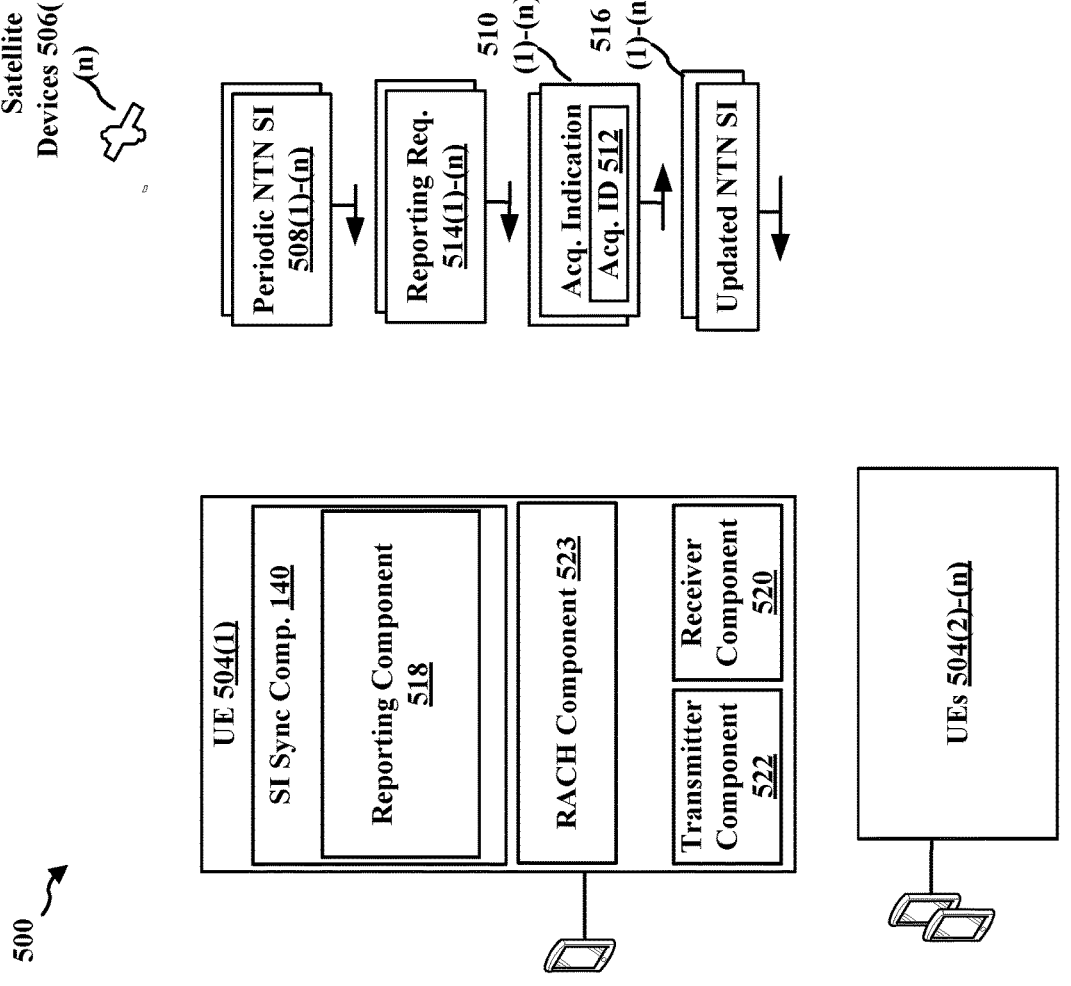

FIG. 5 is a diagram illustrating example communications and components of network entities and devices. As illustrated in FIG. 5, the system 500 may include one or more network entities 502(1)-(n) (e.g., the base station 102/180), one or more UEs 504(1)-(n) (e.g., the UEs 104), and one or more satellites 506(1)-(n). Further, in some aspects, the network entities 502(1)-(n) and/or satellites 506(1)-(n) may serve the UEs 504(1)-(n). In addition, the satellites 506(1)-(n) may relay communications between the network entities 502(1)-(n) and the UEs 504(1)-(n).

In some aspects, a four-step RACH/PRACH procedure may include the network entity 502 receiving a first message (i.e., Msg1) including a random-access preamble from the UE 504, and transmitting a second message (i.e., Msg2) including a random-access response to the UE 504. The four-step RACH/PRACH procedure may further include the network entity 502 receiving a scheduled third message (i.e., Msg3) from the UE 404, and transmit a fourth message (i.e., Msg4) including contention resolution to the UE 504. Additionally, the network entity 502 and UE 504 may exchange additional messages (e.g., Msg5) after the four-step RACH/PRACH procedure is completed. In some other aspects, the RACH/PRACH procedure may be two-step PRACH procedure (i.e., type-2 random access procedure) between the network entity 502 and the UE 504. For example, a two-step PRACH procedure may include the network entity 502 receiving a first message (MsgA) including a random-access preamble and a MsgA-PUSCH transmission from the UE 504, and transmitting a second message (MsgB) including a random-access response to the UE 504. Further, in some aspects, a UE may acquire NTN system information during a RACH/PRACH procedure.

As illustrated in FIG. 5, in some aspects, a network entity may periodically transmit periodic NTN system information (SI) 508(1)-(n) to the UEs 504(1)-(n) during a plurality of modification periods. The periodic NTN SI 508 may include satellite assistance information for the serving cell. Some examples of the period NTN system information 508 may include k_offset, k_mac, epochTime, nta_Common, nta_commondrift, nta-CommonDriftVariation, orbitalParameters, and ul-SyncValidationDuration. In some aspects, the k_offset may be scheduling offset used in the timing relationships in NTN. In some aspects, the k_mac may be a scheduling offset used when downlink and uplink frame timing are not aligned at the eNB. In some aspects, the epochTime may be an epoch time of the satellite ephemeris data and common tracking area (TA) parameters. Further, the UL-SyncValidationDuration may include a validity duration of the satellite ephemeris data and common TA parameters, i.e. maximum time during which the UE can apply the satellite ephemeris without acquiring new satellite ephemeris Each modification period may have a plurality of sub-periods of the same duration. Further, one periodic NTN SI 508 may be transmitted during a sub-period with each of the periodic NTN SIs 508 transmitted within the same modification period having the same cell-specific parameters. For example, a first modification period may have four sub-periods, and four NTN SIs 508(1)-(4) having the same cell-specific parameters may be transmitted within each of the sub-periods, respectively. Further, a second modification period may have four sub-periods, and four NTN SIs 508 (5)-(8) having the same cell-specific parameters may be transmitted within each of the sub-periods, respectively. In addition, the cell-specific parameters of the first modification period may differ from the cell-specific parameters of the second modification period in response to an update to the cell-specific parameters by the transmitting network entity 502.

In some aspects, the periodic NTN SIs 508(1)-(*n*) may be SIB31s relayed by a satellite 506(1) between a network entity 502 and the UEs 504(1)-(*n*). In some other aspects, the periodic NTN SIs 508(1)-(*n*) may be SIB19s transmitted by a satellite 506 to the UEs 504(1)-(*n*), or SIB19s transmitted by a network entity 502 to the UEs 504(1)-(*n*) via a satellite 506. Further, in response to receipt of periodic NTN SIs 508(1)-(*n*), the UEs 504 may transmit acquisition indications 510(1)-(*n*) to the source of the periodic NTN SI 508. For example, the UE 504(1) may receive the periodic NTN SI 508(3) from the network entity 502(1), locally update the cell-specific parameters associated with the network entity 502(1), and transmit an acquisition indication 510(1) indicating that the UE 504(1) received one of more cell-specific parameters of the network entity 502(1). Further, as described in detail herein, the acquisition indication 510(1) may include an acquisition identifier 512. The acquisition identifier 512 may identify an instance within the modification period when the UE 504(1) received the periodic NTN SI 508(3). In some aspects, the acquisition identifier 512 may identify the sub-period of a modification period when the periodic NTN SI 508(3) was received. For example, the acquisition identifier 512(3) within the acquisition indication 510(3) may indicate that the NTN SI 508(3) was received during the third sub-period of a first modification period. In some instances, the UE 504 may only transmit the acquisition indication 510(3) may when the sub-period in which the periodic NTN SI 508(3) was received is the last sub-period of the plurality of sub-periods of the modification period. For example, if the modification has four sub-periods, the UE 504 may not transmit an acquisition indication 510 for periodic NTN SI 508(3) as it was received in the third sub-period and not the fourth sub-period of the modification period. In some other aspects, the acquisition identifier 512 may identify the modification period in which the periodic NTN SI 508(3) was received. In particular, the acquisition identifier 512 may identify whether the periodic NTN SI 508(3) was received in the first half of a modification period (i.e., the current modification period) or the last half of a modification period (i.e., the previous modification period). For example, the acquisition identifier 512(3) within the acquisition indication 510(3) may indicate that the NTN SI 508(3) was received during the first half of the current modification period.

In some aspects, a UE 504 may transmit an acquisition indication 510 in response to a reporting request 514 transmitted by the source of the periodic NTN SI 508 (e.g., the network entity 502). In other words, the network may enable or disable reporting of receipt of the periodic NTN SI 508. Further, the reporting request 514 may indicate the type of report to transmit and the type of communication to use to transmit the acquisition indication 510. For example, the reporting request 514 may request that a UE 504 transmit an acquisition identifier 512 that identifies a sub-period or an acquisition identifier 512 that identifies a modification period. Further, the reporting request 514 may request that a UE 504 transmit an acquisition identifier 512 within a message 1 of a RACH procedure, a message 3 of a RACH procedure, a message 5 after completion of a RACH procedure, or a MAC-CE message.

In some aspects, a network entity 502 may transmit a periodic NTN SI 508 including a reporting request 514. For example, the periodic NTN SI 508 may include a bit representing a reporting request 514 that may request that a UE 504 transmit an acquisition indication 510 within a message 3 of a RACH procedure, a message 5 after completion of a RACH procedure, or a MAC-CE message. In some other aspects, a network entity 502 may transmit a message 4 of a RACH procedure including a reporting request 514. Further, the reporting request 514 within the message 4 may request that the UE 504 transmit an acquisition indication 510 within a message 5 of the RACH procedure.

Further, upon receipt of an acquisition indication 510, a network entity 502 may determine whether the transmitting UE 504 requires updated cell-specific parameters. For example, the network entity 502 may determine that the network entity 502 has updated the cell-specific parameters after receipt of the periodic NTN SI 508 associated with the acquisition indication 510. In response to the determination that the cell-specific parameters of a UE 504 are outdated, a network entity 502 may transmit an updated NTN SI 516 to the UE 504. For example, the network entity 502(1) may transmit a RRC message or a MAC-CE message including the updated cell-specific parameters to the UE 504(1) in response to determining that the UE 504(1) has outdated cell-specific parameters using the acquisition indication 510 (1). In some other examples, the network entity 502(1) may transmit a SIB message (e.g., a SIB31) including the updated cell-specific parameters to the UE 504(1) in response to determining that the UE 504(1) has outdated cell-specific parameters using the acquisition indication 510(1). Further, the updated NTN SI 516 may include updated cell specific parameters. For example, the updated NTN SI 516 may include the most recent K_offset and K_mac generated by the network entity 502.

In some aspects, a network entity 502 may update cell-specific parameters without reporting. For example, a network entity 502 may determine that a UE 504 possesses outdated cell-specific parameters, and transmit an updated SI 516 to the UE 504. For example, when the network entity 502(1) changes the K_offset and K_mac, the network entity 502(1) may determine that the UE 504(1) has not received the updated cell-specific parameters, and transmit the updated K_offset and K_mac within the updated NTN SI 516(1). In some aspects, the network entity 502 may determine that a UE 504 possesses outdated cell-specific parameters based at least in comparing the time the UE 504 performed a successful RACH procedure to the time cell-specific parameters were updated at the network entity 502. For example, the network entity 502(1) may transmit the updated NTN SI 516(1) in response to the network entity 502(1) determining that the cell-specific parameters were updated after the UE 504(1) successfully performed RACH. Further, in some aspects, the updated NTN SI 516(1) may be transmitted within a dedicated RRC message. Alternatively, in some other aspects, a SIB (e.g., an updated SI 516(1)) may be transmitted within message 4 of a RACH procedure, a RRC message after AS security is established, or a MAC-CE message. Alternatively, in some other aspects, an updated cell specific parameter such as K_offset or K_mac may be transmitted within message 4 of a RACH procedure, a RRC message after AS security is established, or a MAC-CE message.

In yet still some other aspects, the periodic NTN SI 508 (e.g., a SIB31) may indicate whether the K_offset and/or K_mac will be updated in the next modification boundary (i.e., the period between two modification periods. For example, a periodic NTN SI 508 may include a k_OffsetChangeNextBoundary parameter that indicates whether the K_offset and/or K_mac will be updated in the next modification boundary. In some instances, if the UE 502(1) determines that the cell-specific parameters are going to be updated in the next modification boundary based on a periodic NTN SI 508, the UE 502(1) may transmit Msg3 or Msg5 of a RACH procedure before the next modification boundary. If the next modification boundary is close, the UE 502(1) may delay the RACH procedure until it re-acquires a periodic NTN SI 508 in the next modification boundary having the updated cell-specific parameters. In some instances, the next modification boundary may be the starting subframe of the SI modification period or SI periodicity or SI window.

As illustrated in FIG. 5, a UE 504(1) includes the SI Sync component 140 which may include a reporting component 518 configured to determine the acquisition identifiers 512 and transmit the acquisition indications 510 including acquisition identifiers 512. Additionally, the UE 504(1) may include a receiver component 520, and a transmitter component 522. The receiver component 520 may include, for example, a RF receiver for receiving the signals described herein. The transmitter component 522 may be configured to generate signals for transmission operations as described herein. The transmitter component 522 may include, for example, a RF transmitter for transmitting the signals described herein. In an aspect, the receiver component 520 and the transmitter component 522 may be co-located in a transceiver (e.g., the transceiver 1110 shown in FIG. 11). Further, in some aspects, a UE 504 may further include a RACH component 523 for performing a RACH/PRACH, and entering a RRC connected mode As illustrated in FIG. 5, the network entity 502 may include the SI sync management component 198. Further, in some aspects, the SI sync management component 198 may be configured to periodically transmit periodic NTN SI 508(1)-(*n*) to the UEs 104, receive acquisition indications 510(1)-(*n*) from the UEs 104 in response to receipt of the periodic NTN SI 508(1)-(*n*), and manage the freshness of the periodic NTN SI 508(1)-(*n*) provided to the UEs 104. Additionally, or alternatively, the SI sync management component 198 may be configured to determine that the UEs 504(1)-(*n*) possess outdated cell-specific parameters, and transmit updated NTN SIs 516(1)-(*n*) to the UE 50(1)-(*n*).

In addition, the network entity 502 may include a receiver component 524 and a transmitter component 526. The receiver component 524 may include, for example, a radio frequency (RF) receiver for receiving the signals described herein. The transmitter component 526 may include, for example, an RF transmitter for transmitting the signals described herein. In an aspect, the receiver component 524 and the transmitter component 526 may be co-located in a transceiver (e.g., the transceiver 1010 shown in FIG. 10).

Figure 6:
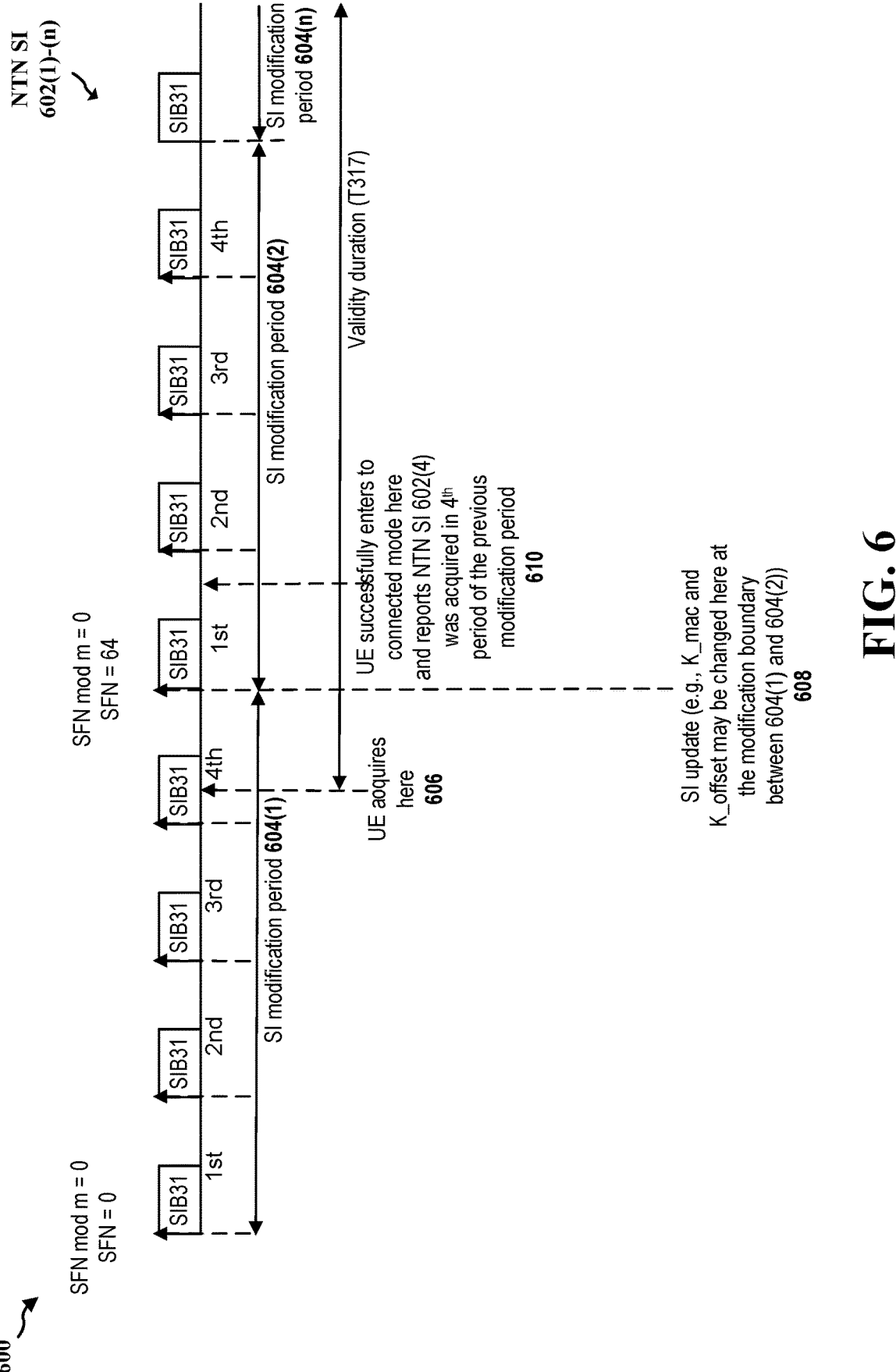
FIG. 6 is a diagram illustrating an example of reporting of an acquisition indication including an acquisition identifier identifying a sub-period of a modification period, in accordance with some aspects of the present disclosure.

FIG. 6 is a diagram 600 illustrating an example of reporting of an acquisition indication including an acquisition identifier identifying a sub-period of a modification period, in accordance with some aspects of the present disclosure. As illustrated in in FIG. 6, a network may transmit a plurality of periodic NTN SI 602 (1)-(*n*) across a plurality of SI modification periods 604(1)-(*n*). At 606, a UE may acquire the NTN SI 602(4) from the network, which includes one or more first cell-specific parameters (e.g., K_mac, K_offset, etc.). Further, at 608, the network may update the one or more cell specific parameters and begin to transmit the one or more second cell-specific parameters via the plurality of periodic NTN SI 602(5)-(8). At 610, the UE may successfully enter a connected mode (e.g., RRC connected mode) and report an acquisition identifier (e.g., acquisition identifier 512) via an acquisition indication (e.g., acquisition indication 510(1)). As described herein, the acquisition identifier may identify that the UE acquired the NTN SI 602(4) from the network during the 4$^{th}$ sub-period of the first modification period 604(1).

Figure 7:
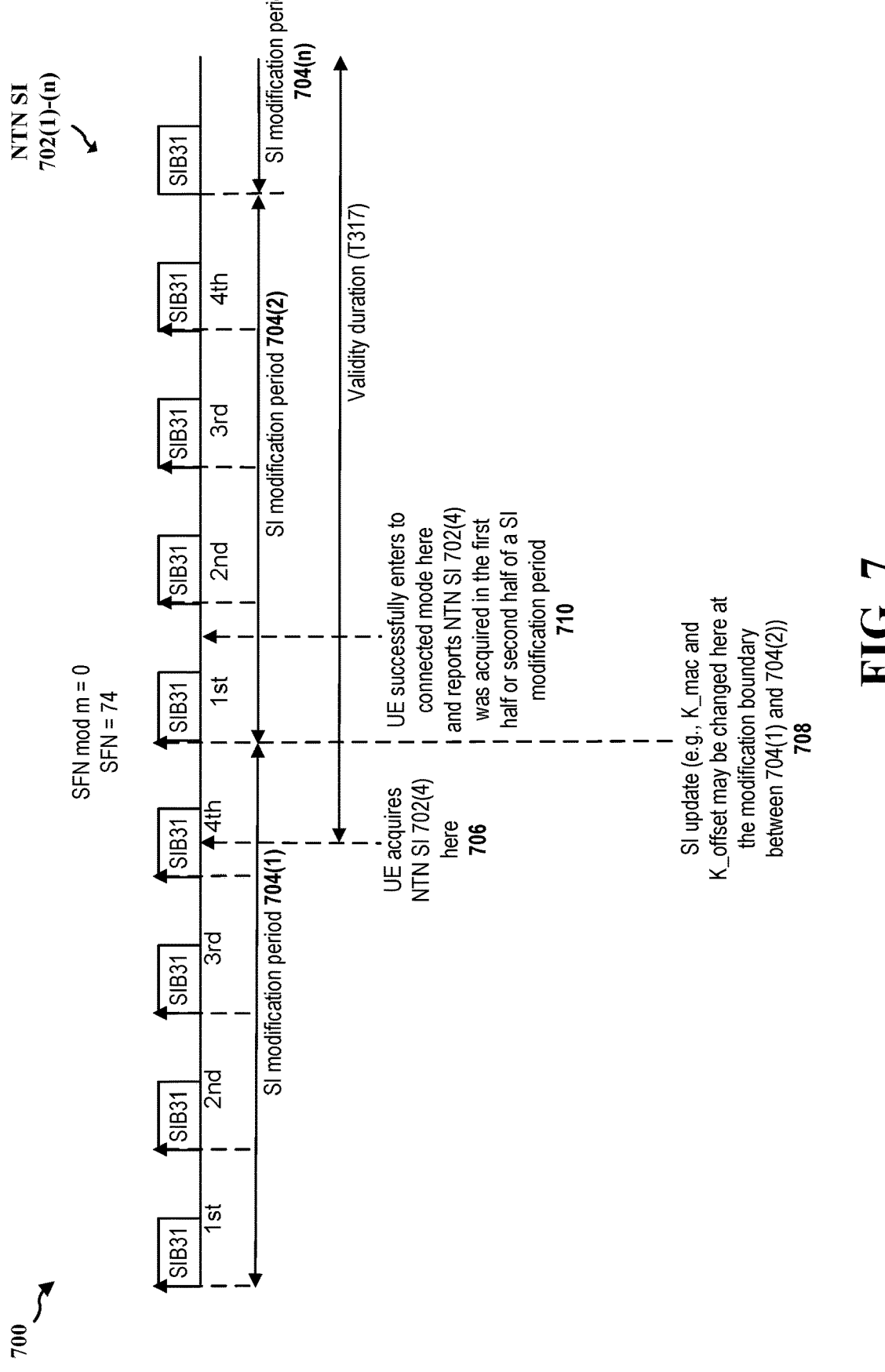
FIG. 7 is a diagram illustrating an example of reporting of an acquisition indication including an acquisition identifier identifying a modification period, in accordance with some aspects of the present disclosure.

FIG. 7 is a diagram 700 illustrating an example of reporting of an acquisition indication including an acquisition identifier identifying a modification period, in accordance with some aspects of the present disclosure. As illustrated in in FIG. 7, a network may transmit a plurality of periodic NTN SI 702(1)-(*n*) across a plurality of SI modification periods 704(1)-(*n*). At 706, a UE may acquire the NTN SI 702(4) from the network, which includes one or more first cell-specific parameters (e.g., K_mac, K_offset, etc.). Further, at 708, the network may update the one or more cell specific parameters and begin to transmit the one or more second cell-specific parameters via the plurality of periodic NTN SI 702(5)-(8). At 710, the UE may successfully enter a connected mode (e.g., RRC connected mode) and report an acquisition identifier (e.g., acquisition identifier 512) via an acquisition indication (e.g., acquisition indication 510(1)). As described herein, the acquisition identifier may identify that the UE acquired the NTN SI 702(4) from the network during the first half of the first modification period 704(1).

Figure 8:
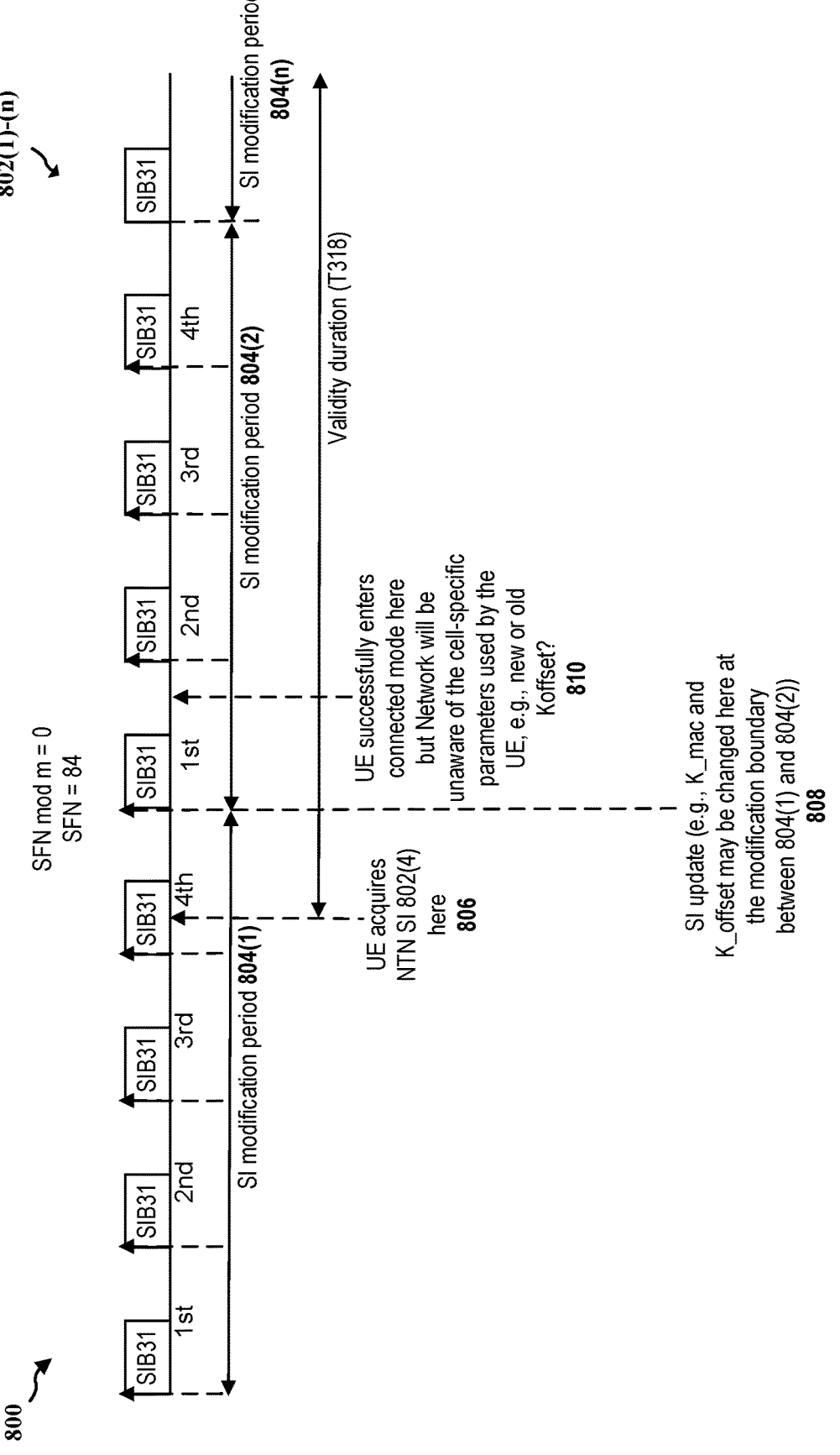
FIG. 8 is a diagram illustrating a first example of acquiring cell-specific parameters without reporting, in accordance with some aspects of the present disclosure.

FIG. 8 is a diagram 800 illustrating an example of reporting of an acquisition indication including an acquisition identifier identifying a sub-period of a modification period, in accordance with some aspects of the present disclosure. As illustrated in in FIG. 8, a network may transmit a plurality of periodic NTN SI 802 (1)-(*n*) across a plurality of SI modification periods 804(1)-(*n*). At 806, a UE may acquire the NTN SI 802(4) from the network, which includes one or more first cell-specific parameters (e.g., K_mac, K_offset, etc.). Further, at 808, the network may update the one or more cell specific parameters and begin to transmit the one or more second cell-specific parameters via the plurality of periodic NTN SI 802(5)-(8). At 810, the UE may successfully enter a connected mode (e.g., RRC connected mode) without reporting. Consequently, the network will be unaware of the cell-specific parameters being used by the UE, which may cause the UE to be out of sync with the network. This may be likely to occur when the UE initiates RACH close to the SI modification boundary between the first and second modification boundaries 804 (1)-(2).

Figure 9:
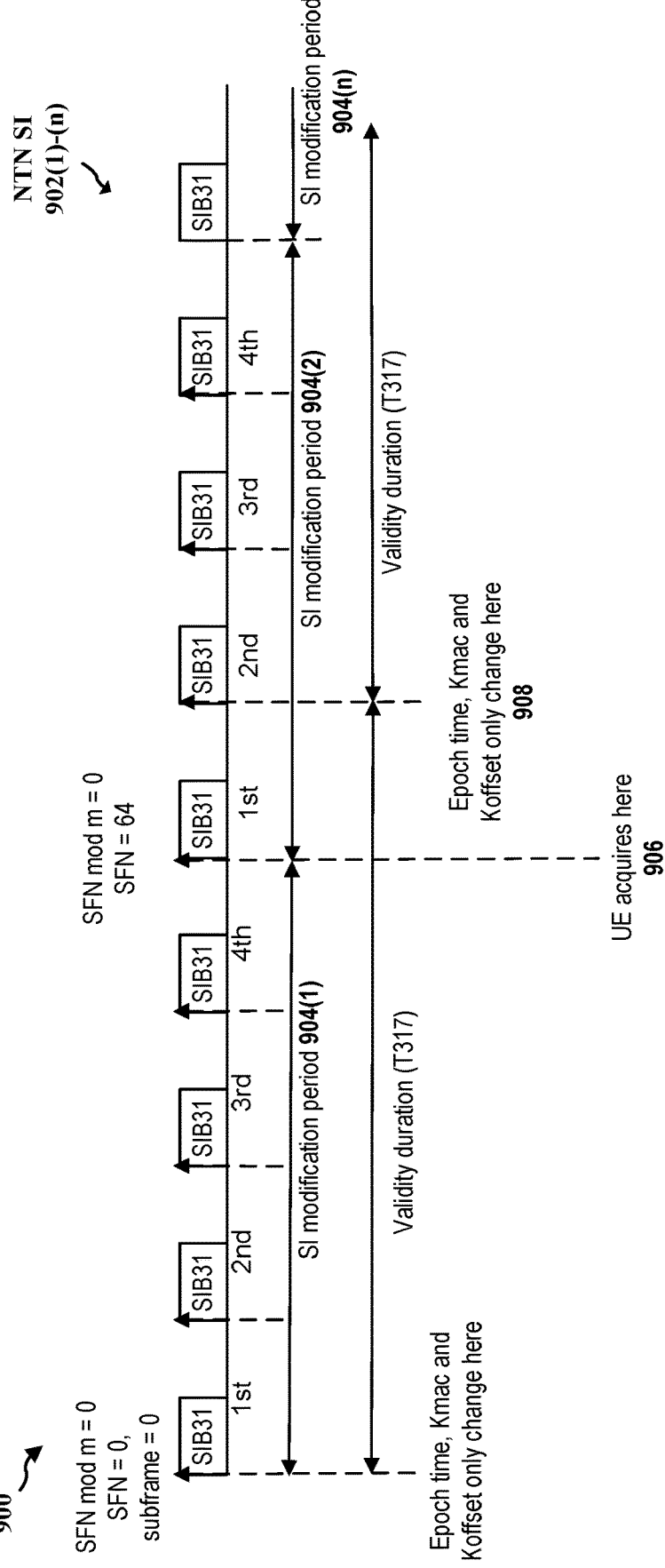
FIG. 9 is a diagram illustrating a second example of acquiring cell-specific parameters without reporting, in accordance with some aspects of the present disclosure.

FIG. 9 is a diagram 900 illustrating a second example of acquiring cell-specific parameters without reporting, in accordance with some aspects of the present disclosure. As illustrated in in FIG. 9, a network may transmit a plurality of periodic NTN SI 902(1)-(*n*) across a plurality of SI modification periods 904(1)-(*n*). At 906, the network may initiate a validity duration for the one or more cell-specific parameters transmitted via periodic NTN SI 902(1)-(4). As illustrated in FIG. 9, the validity timer may begin with the first SI modification period 904(1). At 908, the UE may acquire the NTN SI 902(4) from the network, which includes the one or more first cell-specific parameters (e.g., K_mac, K_offset, etc.). Given that the validity duration ends with the first sub-period of the next modification period 904(2) at 908, the UE will have to reacquire updated cell-specific parameters within a short time frame, which may lead to inefficient power consumption.

Figure 10:
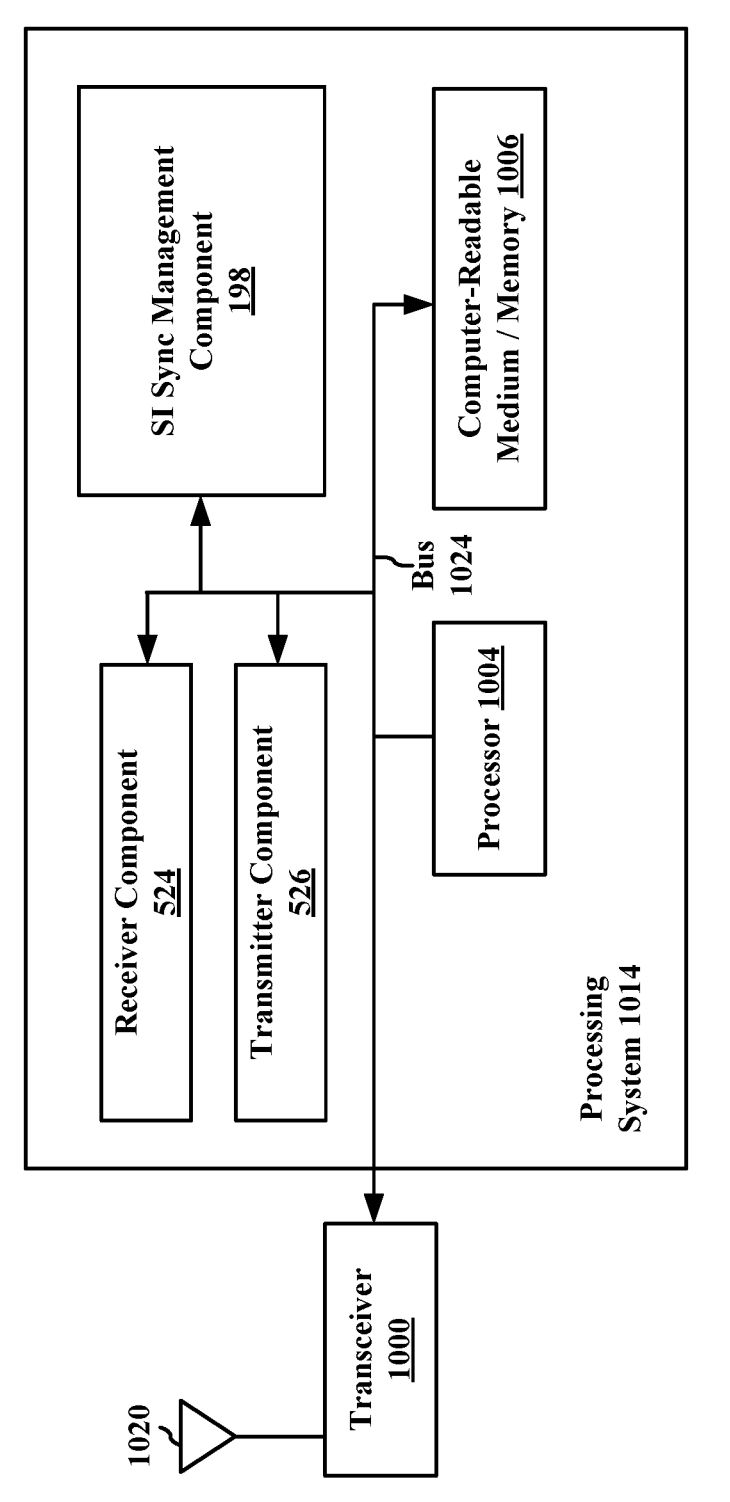
FIG. 10 is a diagram illustrating an example of a hardware implementation for a network entity employing a processing system, in accordance with some aspects of the present disclosure.
Figure 10:

FIG. 10 is a diagram 1000 illustrating an example of a hardware implementation for a network entity 1002 employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the SI sync management component 198, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled with a transceiver 1010. The transceiver 1010 is coupled with one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the receiver component 524. The receiver component 524 may receive the acquisition indications 510(1)-($n$). In addition, the transceiver 1010 receives information from the processing system 1014, specifically the transmitter component 526, and based on the received information, generates a signal to be applied to the one or more antennas 1020. Further, the transmitter component 526 may send the periodic NTN SIs 508(1)-($n$), the reporting requests 514(1)-($n$), and the updated NTN SIs 516(1)-($n$).

The processing system 1014 includes a processor 1004 coupled with a computer-readable medium/memory 1006 (e.g., a non-transitory computer readable medium). The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes the SI sync management component 198. The aforementioned components may be software components running in the processor 1004, resident/stored in the computer readable medium/memory 1006, one or more hardware components coupled with the processor 1004, or some combination thereof. The processing system 1014 may be a component of the base station 310 and may include the memory 376 and/or at least one of the TX processor 316, the RX processor 370, and the controller/processor 375. Alternatively, the processing system 1014 may be the entire base station (e.g., see 310 of FIG. 3, network entity 502 of FIG. 5).

The aforementioned means may be one or more of the aforementioned components of the network entity 1002 and/or the processing system 1014 of the network entity 1002 configured to perform the functions recited by the aforementioned means. As described supra, the processing system 1014 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 11:
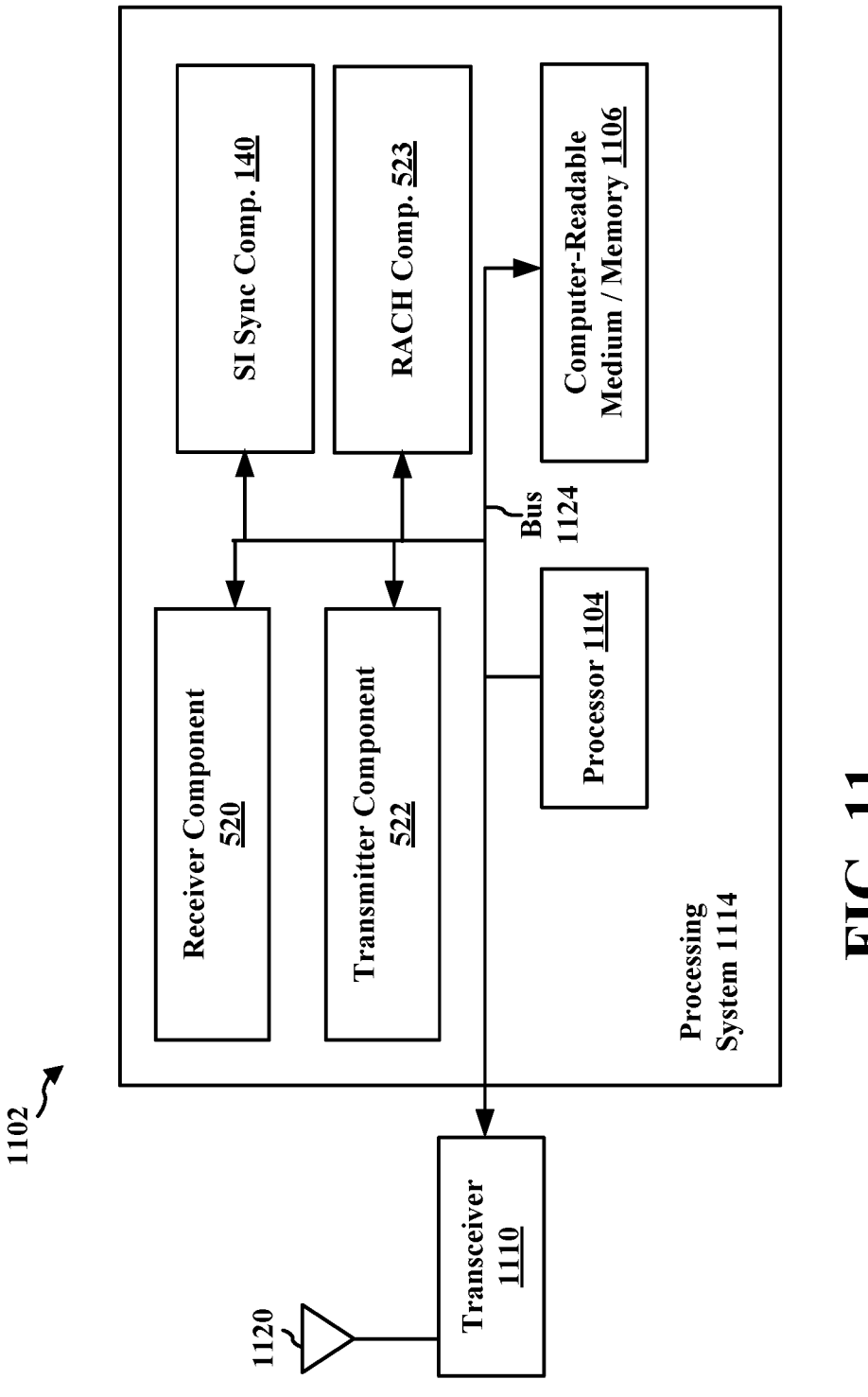
FIG. 11 is a diagram illustrating an example of a hardware implementation for a user equipment employing a processing system, in accordance with some aspects of the present disclosure.

FIG. 11 is a diagram 1100 illustrating an example of a hardware implementation for a device 1102 (e.g., the UE 104, the UE 504, etc.) employing a processing system 1114. The processing system 1114 may be implemented with a bus architecture, represented generally by the bus 1124. The bus 1124 may include any number of interconnecting buses and/or bridges depending on the specific application of the processing system 1114 and the overall design constraints. The bus 1124 links together various circuits including one or more processors and/or hardware components, represented by the processor 1104, the SI sync component 140, the reporting component 518, a RACH component 523, and the computer-readable medium (e.g., non-transitory computer-readable medium)/memory 1106. The bus 1124 may also link various other circuits such as timing sources, peripherals, voltage regulators, and power management circuits, which are well known in the art, and therefore, will not be described any further.

The processing system 1114 may be coupled with a transceiver 1110. The transceiver 1110 may be coupled with one or more antennas 1120. The transceiver 1110 provides a means for communicating with various other apparatus over a transmission medium. The transceiver 1110 receives a signal from the one or more antennas, extracts information from the received signal, and provides the extracted information to the processing system 1114, specifically the receiver component 520. The receiver component 520 may receive the periodic NTN SIs 508(1)-($n$), the reporting requests 514(1)-($n$), and the updated NTN SIs 516(1)-($n$). In addition, the transceiver 1110 receives information from the processing system 1114, specifically the transmitter component 522, and based on the received information, generates a signal to be applied to the one or more antennas. Further, the transmitter component 522 may send acquisition indication 510(1)-($n$).

The processing system 1114 includes a processor 1104 coupled with a computer-readable medium/memory 1106 (e.g., a non-transitory computer readable medium). The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the SI sync component 140, the reporting component 518, or the RACH component 523. The aforementioned components may be a software component running in the processor 1104, resident/stored in the computer readable medium/memory 1106, one or more hardware components coupled with the processor 1104, or some combination thereof. The processing system 1114 may be a component of the device 1102 and may include the memory 360 and/or at least one of the TX processor 368, the RX processor 356, and the controller/processor 359. Alternatively, the processing system 1114 may be the entire UE (e.g., see 350 of FIG. 3, UE 504 of FIG. 5).

The aforementioned means may be one or more of the aforementioned components of the device 1102 and/or the processing system 1114 of device 1102 configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

FIG. 12 is a flowchart of an example method 1200 of reporting acquired cell-specific parameters by UE in an NTN system, in accordance with some aspects of the present disclosure.

The method may be performed by a UE (e.g., the UE 104 of FIGS. 1 and 3, which may include the memory 360 and which may be the entire UE 104 or a component of the UE 104, such as the SI sync component 140, the reporting component 518, the RACH component 523, the TX processor 368, the RX processor 356, and/or the controller/processor 359; the UE 504 of FIG. 5; and/or the device 1102 of FIG. 11).

At block 1210, the method 1200 may include receiving, from a network entity, during a modification period of system information, system information including one or more cell-specific parameters. For example, the UE 504(1) may receive a period NTN SI 508(1) from the network entity 502. Accordingly, the UE 104, the UE 504, the device 1102, the TX processor 368, the RX processor 356, and/or the controller/processor 359, executing the SI sync component 140 may provide means for receiving, from a network entity, during a modification period of system information, system information including one or more cell-specific parameters.

At block 1220, the method 1200 may include entering a radio resource configuration (RRC) connected mode based upon receipt of the system information. For example, the UE 504 may enter a RRC connected mode. Accordingly, the UE 104, the UE 504, the device 1102, the TX processor 368, the RX processor 356, and/or the controller/processor 359 executing the RACH component 523 may provide means for entering a radio resource configuration (RRC) connected mode based upon receipt of the system information.

At block 1230, the method 1200 may include transmitting an acquisition indication of receipt of the system information, the acquisition indication identifying an instance within the modification period of receipt of the updated system information. For example, the UE 504(1) may transit the acquisition indication 510(3) that indicates receipt of the periodic NTN SI 508(3). Further, the acquisition indication 510(3) may include an acquisition identifier 512(3) identifying an instance within the modification period of receipt of the periodic NTN SI 508(3). As described herein, the acquisition identifier 512(3) may identify a sub-period of a modification period and/or the modification period.

Accordingly, the UE 104, the UE 504, the device 1102, the TX processor 368, the RX processor 356, and/or the controller/processor 359 executing the reporting component 518 may provide means for transmitting an acquisition indication of receipt of the system information, the acquisition indication identifying an instance within the modification period of receipt of the updated system information.

FIG. 13 is a flowchart of an example method 1300 of receiving reporting of cell-specific parameters acquired by a UE in an NTN system, in accordance with some aspects of the present disclosure. The method may be performed by a base station (e.g., the base station 102/180 of FIGS. 1 and 3, which may include the memory 376 and which may be the entire base station or a component of the base station, such as SI sync management component 198, the TX processor 316, the RX processor 370, and/or the controller/processor 375; the network entity 502 of FIG. 5; the network entity 1002 of FIG. 10).

At block 1310, the method 1300 includes updating a first SystemInformationBlockType31 (SIB31) from one or more old cell-specific parameters to a second SIB31 including one or more new cell-specific parameters. For example, the network entity 502 may update the cell-specific parameters of the network entity 502 at the modification boundary between two boundary SI modification periods.

Accordingly, the base station 102, the network entity 502, the network entity 1002, the TX processor 316, the RX processor 370, and/or the controller/processor 375 executing the SI sync management component 198 may provide means for updating a first SystemInformationBlockType31 (SIB31) from one or more old cell-specific parameters to a second SIB31 including one or more new cell-specific parameters.

At block 1320, the method 1300 may include determining that the UE has not acquired the one or more new cell-specific parameters via the second SIB31. For example, the network entity 502 may determine that a UE has not acquired one or more current cell-specific parameters. In some aspects, the network entity 502(1) may transmit the updated NTN SI 516(1) in response to the network entity 502(1) determining that the cell-specific parameters were updated after the UE 504(1) successfully performed RACH.

Accordingly, the base station 102, the network entity 502, the network entity 1002, the TX processor 316, the RX processor 370, and/or the controller/processor 375 executing the SI sync management component 198 may provide means for determining that the UE has not acquired the one or more new cell-specific parameters via the second SIB31.

At block 1330, the method 1300 may include determining, to communicate with the UE, using the one or more cell-specific parameters from the first SIB31 or second SIB31. For example, the network entity 502 may determine to communicate with the UE using the cell-specific parameters of the second SIB31. Consequently, the network entity may transmit, via a dedicated message, the second SIB31 to the UE based on the UE not acquiring the one or more new cell-specific parameters via the second SIB31. For example, network entity 502 may transmit the updated NTN SI 516(1) to the UE 504, and communicate to the UE 504(1) based on the cell-specific parameters of the updated NTN SI 516(1).

Accordingly, the base station 102, the network entity 502, the network entity 1002, the TX processor 316, the RX processor 370, and/or the controller/processor 375 executing the SI sync management component 198 may provide means for transmitting, via a dedicated message, the second SIB31 to the UE based on the UE not acquiring the one or more new cell-specific parameters via the second SIB31.

FIG. 14 is a flowchart of a first example method of transmitting fresh system information to a UE in an NTN system, in accordance with some aspects of the present disclosure. The method may be performed by a base station (e.g., the base station 102/180 of FIGS. 1 and 3, which may include the memory 376 and which may be the entire base station or a component of the base station, such as SI sync management component 198, the TX processor 316, the RX processor 370, and/or the controller/processor 375; the network entity 502 of FIG. 5; the network entity 1002 of FIG. 10).

At block 1410, the method 1400 includes transmitting, to the UE, during a modification period of system information, system information including one or more cell-specific parameters. For example, the network entity 502 may broadcast the periodic NTN SIs 508(1)-(*n*). Further, the UE 504(1) may receive the periodic NTN SI 508(1).

Accordingly, the base station 102, the network entity 502, the network entity 1002, the TX processor 316, the RX processor 370, and/or the controller/processor 375 executing the SI sync management component 198 may provide means for transmitting, to the UE, during a modification period of system information, system information including one or more cell-specific parameters.

At block 1420, the method 1400 may include receiving, from the UE, an acquisition indication of receipt of the system information, the acquisition indication identifying an instance within the modification period of receipt of the system information. For example, the network entity may receive an acquisition indication 501(1) from the UE 504(1) in response to receipt of the periodic NTN SI 508(1) by the UE 504(1).

Accordingly, the base station 102, the network entity 502, the network entity 1002, the TX processor 316, the RX processor 370, and/or the controller/processor 375 executing the SI sync management component 198 may provide means for receiving, from the UE, an acquisition indication of receipt of the system information, the acquisition indication identifying an instance within the modification period of receipt of the system information.

At block 1430, the method 1400 may include communicating with the UE based on the one or more cell-specific parameters. For example, the network entity 502 and the UE 504 may exchange communications based on the cell-specific parameters of the periodic NTN SI 508(1).

Accordingly, the base station 102, the network entity 502, the network entity 1002, the TX processor 316, the RX processor 370, and/or the controller/processor 375 executing the SI sync management component 198 may provide means for communicating with the UE based on the one or more cell-specific parameters.

The previous description is provided to enable any person having ordinary skill in the art to practice the various aspects described herein. Various modifications to these aspects will be readily apparent to a person having ordinary skill in the art, and the generic principles defined herein may be applied to other aspects. The claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to a person having ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following example clauses describe various aspects of the present disclosure.

A. A method of non-terrestrial network (NTN) wireless communication at a user equipment (UE), comprising: receiving, from a network entity, during a modification period of system information, system information including one or more cell-specific parameters; entering a radio resource configuration (RRC) connected mode based upon receipt of the system information; and transmitting an acquisition indication of receipt of the system information, the acquisition indication identifying an instance within the modification period of receipt of the system information.

B. The method of clause A recites, wherein the system information is one of four system information blocks of type thirty-one (SIB31) periodically transmitted by the network entity during the modification period.

C. The method of clause A, wherein the system information is one of four system information blocks of type thirty-one (SIB31) or system information blocks of type nineteen (SIB19) periodically transmitted by the network entity during the modification period, and the system information includes a cell-specific K_offset and a K_mac.

D. The method of clause A, wherein the acquisition indication includes an index identifier identifying a particular sub-period of a plurality of sub-periods of the modification period as a sub-period in which the acquisition indication was received, wherein the network entity transmits an individual SystemInformationBlockType31 (SIB31) or SystemInformationBlockType19 (SIB19) during each sub-period of the plurality of sub-periods.

E. The method of clause D, wherein transmitting the acquisition indication comprises: determining that system information was received within a last sub-period of the plurality of sub-periods; and transmitting the acquisition indication including the index identifier in response to system information being received within the last sub-period of the plurality of sub-periods.

F. The method of any of clauses A-C, wherein the acquisition indication includes a modification period identifier identifying a particular half of the modification period as a half of the modification period in which the acquisition indication was received.

G. The method of any of clauses A-F, wherein the acquisition indication is a radio resource configuration (RRC) message or a media access control-control element (MAC-CE) message.

H. The method of any of clauses A-G, wherein the acquisition indication is a message 1, message 3, message 4, or message A of a random access procedure for entering the RRC connected mode.

I. The method of any of clauses A-H, wherein the system information includes a request for transmission of the acquisition indication in response to receipt of the system information.

J. The method of any of clauses A-G, further comprising receiving a message 4 of a random access channel procedure that requests transmission of the acquisition indication in response to receipt of the system information.

K. The method of clause A, wherein the system information includes first system information, the modification period is a first modification period, the one or more cell-specific parameters are one or more first cell-specific parameters, and further comprising: receiving, from the network entity, during a second modification period of system information, second system information including one or more second cell-specific parameters in response to the network entity determining that the one or more first cell-specific parameters are outdated based on the acquisition indication.

L. The method of any of clauses A-J, wherein the system information includes first system information, the modification period is a first modification period, and further comprising: receiving, from the network entity, during a second modification period of system information, second system information including an update to timing information of the one or more cell-specific parameters in response to the network entity evaluating the acquisition indication.

M. The method of any of clauses A-L, wherein the system information includes a cell-specific K_offset and a K_mac.

N. One or more non-transitory computer-readable media encoded with instructions that, when executed by one or more processors, configure a computing device to perform a computer-implemented method as any of clauses A-M recite.

O. A device comprising one or more processors and one or more computer-readable media encoded with instructions that, when executed by the one or more processors, configure a computer to perform a computer-implemented method as any of clauses A-M recite.

P. A device, comprising means for performing the method of any of clauses A-H.

Q. A method of non-terrestrial network (NTN) wireless communication at a network entity with a user equipment (UE), comprising: update a first SystemInformationBlock-Type31 (SIB31) from one or more old cell-specific parameters to a second SIB31 including one or more new cell-specific parameters; determine that the UE has not acquired the one or more new cell-specific parameters via the second SIB31; and determine, to communicate with the UE, using the one or more cell-specific parameters from the first SIB31 or second SIB31.

R. The method of clause Q, wherein the first SIB31 includes an indication that indicates whether the cell-specific parameters are going to be updated in as next frame boundary.

S. The method of any of clauses Q-R, wherein the next frame boundary is starting frame of a modification period, or a periodicity or a system information window.

T. The method of any of clauses Q-S, wherein the network entity determines to use the one or more cell-specific parameters from the second SIB31; and transmit, via a dedicated message, the one or more cell-specific parameters from the second SIB31 to the UE.

U. The method of any of clauses Q-T, wherein to determine that the UE has not acquired the one or more new cell-specific parameters, the at least one processor is further configured to execute the computer-executable instructions to determine that the update occurred before a random access channel procedure was performed between the network entity and the UE and during a modification period associated with the first SIB31.

V. The method of any of clauses Q-U, wherein the one or more new cell-specific parameters include includes a cell-specific K_offset and a K_mac.

W. One or more non-transitory computer-readable media encoded with instructions that, when executed by one or more processors, configure a computing device to perform a computer-implemented method as any of clauses Q-V recite.

X. A device comprising one or more processors and one or more computer-readable media encoded with instructions that, when executed by the one or more processors, configure a computer to perform a computer-implemented method as any of clauses Q-V recite.

Y. A device, comprising means for performing the method of any of clauses Q-V.

Z. A method of non-terrestrial network (NTN) wireless communication by a network entity with a user equipment (UE), comprising: transmitting, to the UE, during a modification period of system information, system information including one or more cell-specific parameters; receiving, from the UE, an acquisition indication of receipt of the system information, the acquisition indication identifying an instance within the modification period of receipt of the system information; and communicating with the UE based on the one or more cell-specific parameters.

AA. The method of clause Z, wherein the system information is one of four SystemInformationBlockType31 (SIB31) periodically transmitted by the network entity during the modification period and the system information includes a K_offset and K_mac.

AB. The method of any of clauses Z-AA, wherein the acquisition indication is a radio resource configuration (RRC) message or a media access control-control element (MAC-CE) message.

AC. The method of any of clauses Z-AB, wherein the acquisition indication is included in a message 1, message 3, message 5, or message A of a random access procedure for entering an RRC connected mode.

AD. The method of any of clauses Z-AC, wherein the system information includes a request for transmission of the acquisition indication in response to receipt of the system information.

AE. The method of any of clauses Z-AC, further comprising: transmitting a message 4 of a random access channel procedure that includes a request for transmission of the acquisition indication in response to receipt of the system information.

AF. The method of any of clauses Z-AE, wherein the acquisition indication includes an index identifier identifying a particular sub-period of a plurality of sub-periods of the modification period as the sub-period in which the acquisition indication was received, or a modification period identifier identifying a particular half of the modification period as the half of the modification period in which the acquisition indication was received.

AG. The method of any of clauses Z-AF, wherein the system information includes first system information, the modification period is a first modification period, the one or more cell-specific parameters are one or more first cell-specific parameters, and further comprising: determining that the one or more first cell-specific parameters are outdated based on the acquisition indication; and transmitting, to the UE, based on the one or more first cell-specific parameters being outdated, during a second modification period of system information, second system information including one or more second cell-specific parameters in response to the network entity.

AH. The method of any of clauses Z-AA, wherein the system information includes first system information, the modification period is a first modification period, and further comprising: modifying a validity period of the one or more cell-specific parameters; and transmitting, to the UE, based on the one or more cell-specific parameters being modified, during a second modification period of system information, second system information including an update to validity period of the one or more cell-specific parameters.

AI. One or more non-transitory computer-readable media encoded with instructions that, when executed by one or more processors, configure a computing device to perform a computer-implemented method as any of clauses Z-AH recite.

AJ. A device comprising one or more processors and one or more computer-readable media encoded with instructions that, when executed by the one or more processors, configure a computer to perform a computer-implemented method as any of clauses Z-AH recite.

AK. A device, comprising means for performing the method of any of clauses Z-AH.

What is claimed is:

1. A user equipment (UE) for non-terrestrial network (NTN) wireless communication, comprising:

a memory storing computer-executable instructions; and at least one processor coupled with the memory and configured to execute the computer-executable instructions to:

receive, from a network entity, during a modification period of system information, system information including one or more cell-specific parameters;

enter a radio resource configuration (RRC) connected mode based upon receipt of the system information; and transmit an acquisition indication of receipt of the system information, the acquisition indication identifying an instance within the modification period of receipt of the system information.

2. The UE of claim 1, wherein the system information is one of four system information blocks of type thirty-one (SIB31) periodically transmitted by the network entity during the modification period.

3. The UE of claim 1, wherein the acquisition indication includes an index identifier identifying a particular sub-period of a plurality of sub-periods of the modification period as a sub-period in which the system information was received, wherein the network entity transmits an individual SystemInformationBlockType31 (SIB31) during each sub-period of the plurality of sub-periods.

4. The UE of claim 1, wherein to transmit the acquisition indication, the at least one processor is further configured to execute the computer-executable instructions to:

determine that system information was received within a last sub-period of a plurality of sub-periods; and transmit the acquisition indication including an index identifier in response to the system information being received within the last sub-period of the plurality of sub-periods.

5. The UE of claim 1, wherein the acquisition indication includes a modification period identifier identifying a particular half of the modification period as a half of the modification period in which the system information was received.

6. The UE of claim 1, wherein the acquisition indication is a radio resource configuration (RRC) message or a media access control-control element (MAC-CE) message, or wherein the acquisition indication is included in a message 1, message 3, message 5, or message A of a random access procedure for entering the radio resource configuration (RRC) connected mode.

7. The UE of claim 1, wherein the system information includes a request for transmission of the acquisition indication in response to receipt of the system information.

8. The UE of claim 1, wherein a message 4 of a random access channel procedure requests transmission of the acquisition indication in response to receipt of the system information.

9. The UE of claim 1, wherein the system information includes first system information, the modification period is a first modification period, the one or more cell-specific parameters are one or more first cell-specific parameters, and the at least one processor is further configured to execute the computer-executable instructions to:

receiving, from the network entity, during a second modification period of system information, second system information including one or more second cell-specific parameters in response to the network entity determining that the one or more first cell-specific parameters are outdated based on the acquisition indication.

10. The UE of claim 1, wherein the system information includes a cell-specific K_offset and a K_mac.

11. A method of non-terrestrial network (NTN) wireless communication at a user equipment (UE), comprising:

receiving, from a network entity, during a modification period of system information, system information including one or more cell-specific parameters;

entering a radio resource configuration (RRC) connected mode based upon receipt of the system information; and transmitting an acquisition indication of receipt of the system information, the acquisition indication identifying an instance within the modification period of receipt of the system information.

12. The method of claim 11, wherein the system information is one of four system information blocks of type thirty-one (SIB31) or system information blocks of type nineteen (SIB19) periodically transmitted by the network entity during the modification period, and the system information includes a cell-specific K_offset and a K_mac.

13. The method of claim 11, wherein the acquisition indication includes an index identifier identifying a particular sub-period of a plurality of sub-periods of the modification period as a sub-period in which the system information was received, wherein the network entity transmits an individual SystemInformationBlockType31 (SIB31) or SystemInformationBlockType19 (SIB19) during each sub-period of the plurality of sub-periods.

14. The method of claim 13, wherein transmitting the acquisition indication comprises:

determining that system information was received within a last sub-period of the plurality of sub-periods; and transmitting the acquisition indication including the index identifier in response to system information being received within the last sub-period of the plurality of sub-periods.

15. The method of claim 11, wherein the acquisition indication includes a modification period identifier identifying a particular half of the modification period as a half of the modification period in which the system information was received.

16. The method of claim 11, wherein the acquisition indication is a radio resource configuration (RRC) message or a media access control-control element (MAC-CE) message, or wherein the acquisition indication is included in a message 1, a message 3, message 5, or message A of a random access procedure for entering the RRC connected mode.

17. The method of claim 11, wherein the system information includes first system information, the modification period is a first modification period, the one or more cell-specific parameters are one or more first cell-specific parameters, and further comprising:

receiving, from the network entity, during a second modification period of system information, second system information including one or more second cell-specific parameters in response to the network entity determining that the one or more first cell-specific parameters are outdated based on the acquisition indication.

18. The method of claim 11, wherein the system information includes first system information, the modification period is a first modification period, and further comprising:

receiving, from the network entity, during a second modification period of system information, second system information including an update to timing information of the one or more cell-specific parameters in response to the network entity evaluating the acquisition indication.

* * * * *